United States Patent
Dunham et al.

(10) Patent No.: US 7,938,073 B2
(45) Date of Patent: May 10, 2011

(54) AIR SEED METER WITH DEBRIS CLEARING DEVICE

(75) Inventors: Lisle J. Dunham, Grinnell, IA (US); Alan F. Barry, Lincoln, NE (US)

(73) Assignee: Kinze Manufacturing, Inc., Williamsburg, IA (US)

(*) Notice: Subject to any disclaimer, the term of this patent is extended or adjusted under 35 U.S.C. 154(b) by 14 days.

(21) Appl. No.: 12/234,880

(22) Filed: Sep. 22, 2008

(65) Prior Publication Data

US 2009/0078179 A1    Mar. 26, 2009

Related U.S. Application Data

(60) Provisional application No. 60/974,957, filed on Sep. 25, 2007.

(51) Int. Cl.
*A01C 7/00* (2006.01)
*A01C 9/00* (2006.01)

(52) U.S. Cl. .................................................. 111/185
(58) Field of Classification Search ........... 111/177–185
See application file for complete search history.

(56) References Cited

U.S. PATENT DOCUMENTS

| | | | | |
|---|---|---|---|---|
| 3,369,702 | A  * | 2/1968 | Paul .............................. | 221/211 |
| 3,888,387 | A  * | 6/1975 | Deckler ......................... | 221/278 |
| 4,145,980 | A  * | 3/1979 | Boots ............................ | 111/188 |
| 6,308,645 | B1 * | 10/2001 | Newkirk et al. ............... | 111/63 |
| 7,490,565 | B2 * | 2/2009 | Holly ............................. | 111/174 |
| 2005/0150442 | A1 * | 7/2005 | Friesen ......................... | 111/185 |
| 2007/0039529 | A1 * | 2/2007 | Sauder et al. ................. | 111/174 |
| 2007/0107645 | A1 * | 5/2007 | Mariman et al. .............. | 111/185 |
| 2008/0250993 | A1 * | 10/2008 | Mariman et al. .............. | 111/185 |
| 2009/0000533 | A1 * | 1/2009 | Wendte ......................... | 111/183 |

* cited by examiner

*Primary Examiner* — Christopher J. Novosad
(74) *Attorney, Agent, or Firm* — Thomas E. Hill; Wildman, Harrold, Allen & Dixon LLP

(57) ABSTRACT

An air seed meter having a rotating disc with seed openings arranged in a circumferential pattern includes a holder adapted to be mounted to the meter housing and carries two balls spring-biased to reciprocate and enter the seed openings as they pass and clear debris from the openings. The balls may also engage dimples on the seed disc located between seed openings or groups of seed openings (in the case of a hill drop planter) in the disc as it rotates to cause vibration in the disc to promote the release of seeds as they exit the vacuum chamber.

10 Claims, 4 Drawing Sheets

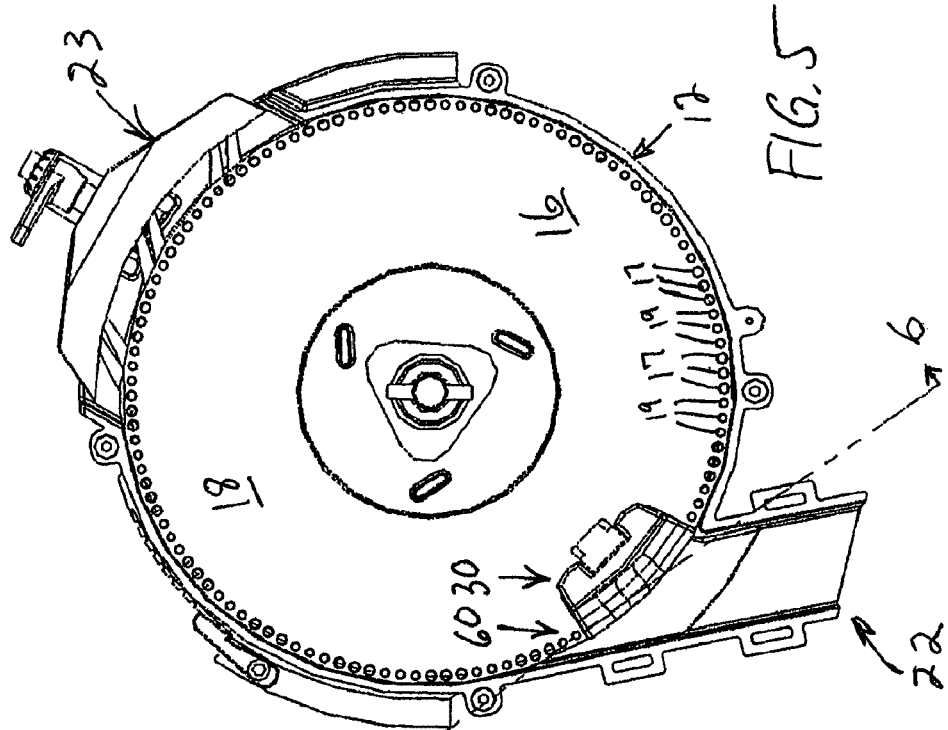
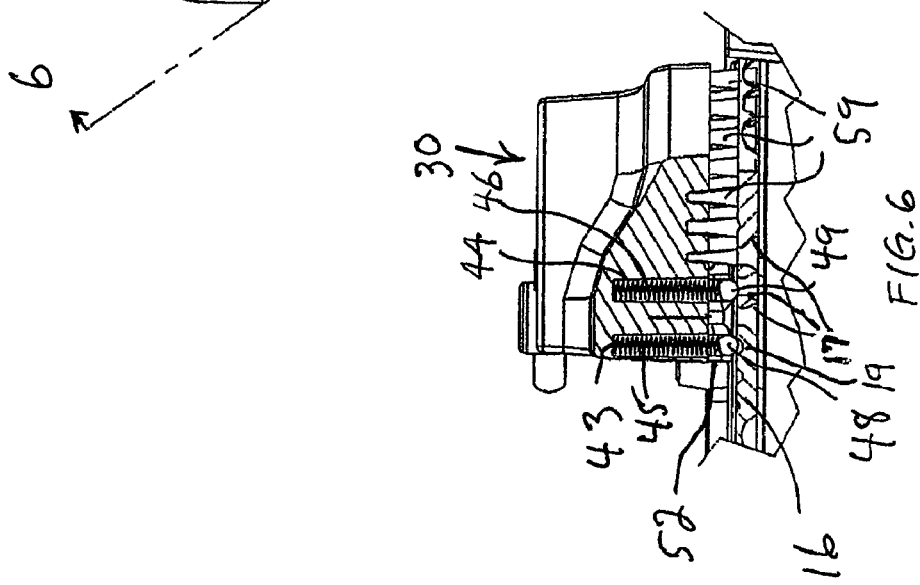

AIR SEED METER WITH DEBRIS CLEARING DEVICE

RELATED APPLICATION

This application claims the benefit of U.S. Provisional Application No. 60/974,957 filed Sep. 25, 2007 for "AIR SEED METER WITH DEBRIS CLEARING DEVICE".

FIELD OF THE INVENTION

The present invention relates to air seed meters for agricultural planters. A typical air seed meter has a disc with apertures for securing and releasing seed in predetermined spaced relation from a seed reservoir to a delivery area. More particularly, the invention relates to a device which may be located immediately downstream of the seed release area for clearing debris from the seed openings, while generating vibrations adjacent the area of seed release to facilitate release.

BACKGROUND OF THE INVENTION

An air seed meter includes a reservoir for receiving and storing seed for planting, and a vacuum chamber which is typically evacuated by a powered fan, creating a partial vacuum (i.e. a sub-atmospheric pressure) on a disc having seed apertures and mounted for rotation between the seed reservoir and the vacuum chamber. Thus, seeds are secured to the rotating disc by differential air pressure, and released as a seed opening securing the seed passes out of the vacuum chamber and is exposed to the atmosphere.

There are many different types of debris smaller than seeds which may interfere with the efficient and accurate operation of this type of meter. These particles may include burrs from cotton plants, fragments of seed chipped off from handling and not separated from the seed, fragments created in the meter itself, or other remnants or plugs capable of being lodged in a seed opening secured by the pressure differential, and either affecting (i.e. diminishing) the desired retaining value of the vacuum, or preventing the seed from being lodged in a seed opening. Moreover, foreign material may also be found mixed in the seed as the farmer purchases it. Thus, there are many types of undesired foreign material other than seed remnants and chips which may interfere with the accurate, efficient operation of an air seed meter, primarily because this type of meter relies on a source for suctioning air or compressing air to secure the seeds to a rotating seed disc for the purpose of spacing, singulation and delivery of the seed and the pressure differential across a seed opening has a tendency to gather debris and convey it through a seed opening, but the debris may get caught in the seed opening.

It is thus desirable to clear debris (which is broadly intended to include all undesired seed remnants, foreign material, "burrs" or other particulate matter other than seed which may tend to plug or accumulate in the seed openings).

Different types of solutions to this debris problem have been proposed, such as the use of compressed air to clean the seed disc openings. Some prior attempts to solve this problem have required the use of supplementary power, such as the compressed air mentioned, or that the clearance devices be permanently attached to the meter.

SUMMARY OF THE INVENTION

The present invention includes a passive device (i.e., not powered) which is adapted to be manually mounted to or removed (i.e., without tools) from the housing of an air seed meter of the type disclosed in U.S. Pat. No. 7,093,548, the disclosure of which is expressly incorporated herein by reference in its entirety The clearing device is used to clear seed remnants or other debris from the seed openings in the seed disc after the seeds have been singulated and released for deposit in the furrow. The same device may be used with detents (i.e. not "through holes", as are seed openings in an air seed meter) in the disc to generate vibrations in the seed disc adjacent the seed release point to promote the release of seeds.

The instant clearing device includes a base or block preferably having two bores, each receiving a coil spring and a ball, and a retainer for securing the balls in their respective bores while permitting them to move into an aligned seed opening independently of each other. Each ball is biased by its associated spring to engage the seed opening (or detent). The retainer is positioned adjacent the vacuum side of the seed disc immediately downstream of the seed release area, such that as the disc rotates to deliver seeds from the seed reservoir to the seed discharge chute, and the seed is released, a first ball enters a seed opening to clear it of remnants, or dislodge a plug, while the second ball rides on the surface (i.e. the vacuum side) of the disc. As the disc continues to rotate, the first ball is forced out of that seed opening to ride on the vacuum side of the disc; and the second ball then enters the same opening to clear any remaining debris. Each time a ball is forced into or driven out of a hole (or detents, to be described), vibration is sent up in the disc. The vibration assists in releasing the next seed exiting the vacuum chamber and loosening lodged debris.

A series of tufts of brush bristles may be secured in the base of the clearing device, and positioned to brush the seed holes and arranged to clear any loosened or remaining debris. The debris clearing device includes a clamp which permits it to be mounted to the meter housing, or removed from it, by hand, without the need of tools The movable ball arrangement may also be used in certain applications (such as cotton seeds or in hill drop planters) and cooperating with dimples (i.e., not through-holes) between the seed holes to create additional vibration or "chatter" adjacent the seed discharge area to promote the release of seeds and debris as the seed holes exit the vacuum chamber. Other features and advantages will be apparent to those skilled in the art from the following description of the illustrated embodiment, accompanied by the drawings, in which the same reference numeral, will refer to the same element in the various views.

BRIEF DESCRIPTION TO THE DRAWINGS

Figure 2:
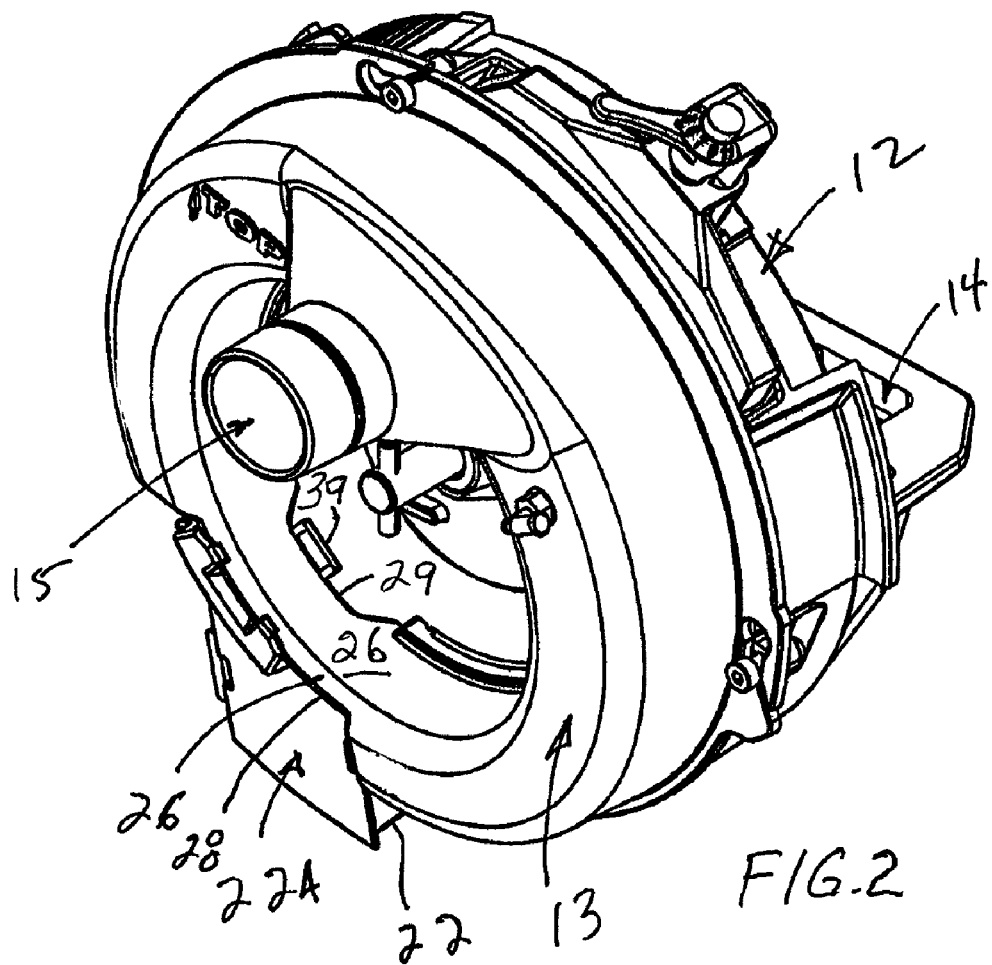
FIG. 2 is an upper, right side perspective view of a complete seed meter.
Figure 3:
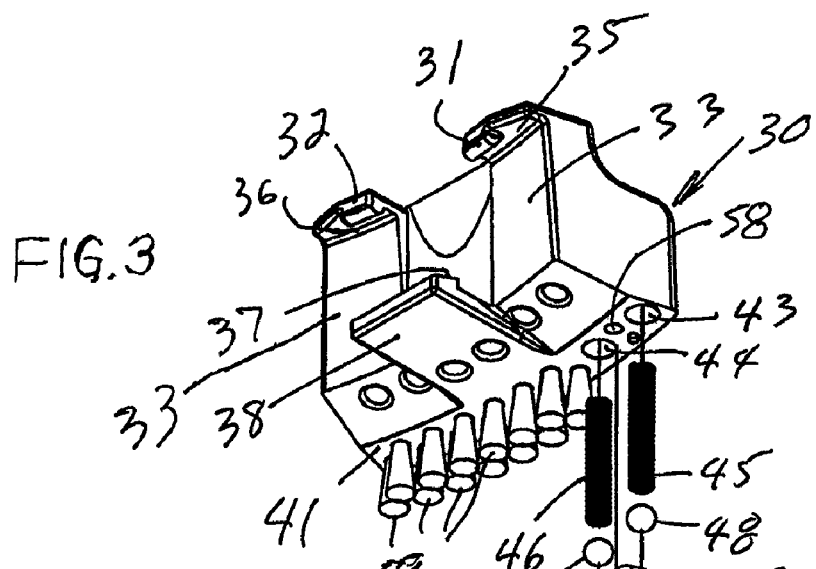
FIG. 3 is a perspective view of a debris clearing device incorporated in the seed meter of FIG. 1 with some of the components shown in exploded relation.
Figure 4:
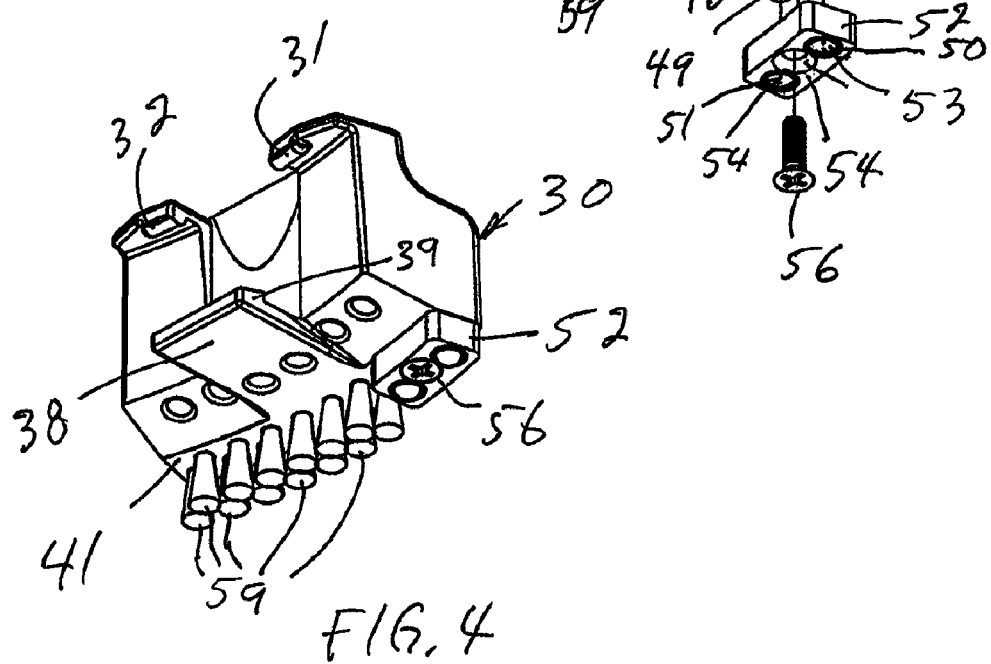

FIG. 4 is a perspective view similar to FIG. 3, but with the elements of the debris clearing device shown in assembled relation FIG. 5 is a side elevation view of the meter of FIG. 2 with the vacuum cover removed for clarity, and the debris clearing device in an operative position; and FIG. 6 is a fragmentary cross sectional view of the debris clearing device and seed disc, taken along sight line 6-6 of FIG. 5.

DETAILED DESCRIPTION OF THE ILLUSTRATED EMBODIMENT

Figure 1:
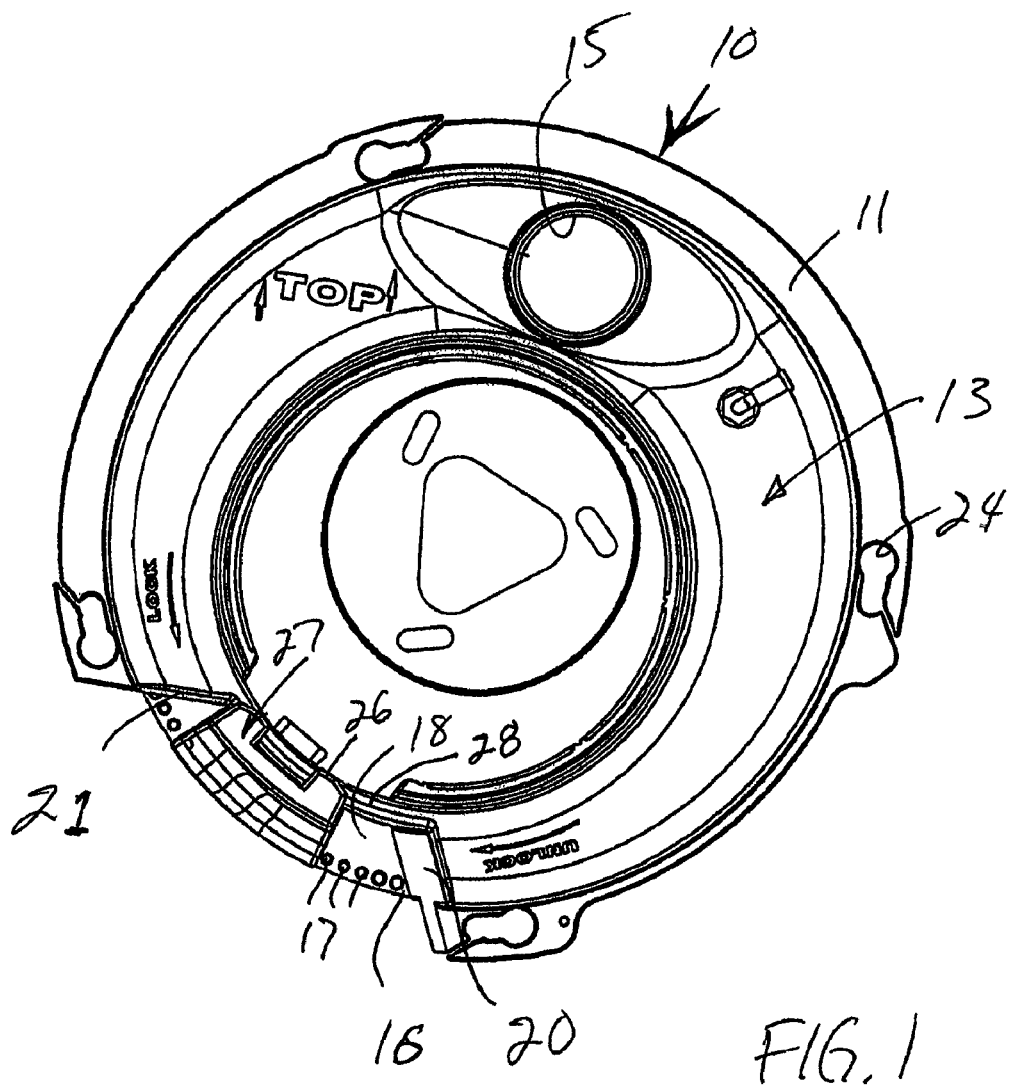
FIG. 1 is an elevational front view of the vacuum cover and seed disc of an air seed meter incorporating the present invention.

Referring to FIGS. 1 and 2, reference numeral 10 generally designates an air seed meter as described in U.S. Pat. No. 7,093,548 issued Aug. 22, 2006 but which does not have a debris clearing device such as described herein. The meter includes a vacuum cover 11 which defines a vacuum chamber 13 within the vacuum cover 11, and a seed housing 12 (FIG. 2) which provides a reservoir for holding seed delivered under gravity through an opening 14 (FIG. 2), and is removably coupled to the vacuum cover 11. The vacuum cover 11 and seed housing, when assembled, form a meter housing.

An opening 15 of the vacuum housing is typically coupled to an exhaust conduit which, in turn, communicates with a fan or other air suction device for drawing air from within the vacuum chamber 13. The vacuum chamber and seed reservoir are separated, and each is partially defined by a seed disc 16 (FIGS. 1 and 5) which, in the illustrated embodiment, is provided with a series of seed openings such as those designated 17 which are through-holes located at the same radius from the center of the disc and circumferentially spaced apart, and typically located adjacent the perimeter of the seed disc. The seed openings 17 may, in some instances, be located on the perimeter—that is, they may not be closed openings, but rather open into the perimeter of the disc, but nevertheless extend through the disc.

In the illustrated embodiment, the meter is of the type referred to as a "hill drop" meter. That is, the meter drops a plurality or group of seeds (e.g. three, in the illustrated embodiment) at approximately the same time, and they are deposited in a group. The seeds of each group are closely spaced; and the spacing between adjacent groups of seeds is greater, as determined by the specific application and disc selected. In this case, the groups of three seed openings are separated by groups of detents or dimples 19 which are also three to a group in the illustrated embodiment. The detents 19 do not extend through the disc 16, so there is no suction to retain any seed or material in the detents. Rather, the detents are used to generate vibration in the disc adjacent the point of seed release, as will be clear from subsequent description, to facilitate release of seed or debris in nearby seed openings as the seeds pass outside the vacuum chamber. This is sometimes referred to as the seed release area. The seeds are free to fall because the spring-biased balls are preferably located immediately downstream (in the direction of disc rotation) of the seed release area.

In the embodiment illustrated in FIGS. 1 and 5, the seed disc 16 rotates in a counter-clockwise direction, and the surface or side 18 of the seed disc 16 which is seen by the observer is referred to as the "vacuum side" because it partially defines a vacuum chamber 13 within the vacuum cover 11 (FIGS. 2 and 5). The vacuum chamber 13 extends circumferentially about the seed disc from a first or beginning end wall 20 (FIG. 1) to a terminating end wall 21. The vacuum cover 11 is provided, as seen, with mounting apertures such as that designated 24 for removably mounting to studs on the seed housing 12 which provides a reservoir for the seed which is delivered under gravity to the seed reservoir via opening 14. Individual seeds are picked up by the seed openings 17 as the openings pass through the seed reservoir and are subjected to the suction or vacuum. The seeds are held in the seed openings of the disc 16 by the pressure differential across the disc.

Typically, some device may be employed to insure that only a single seed occupies a seed opening in the disc. These devices are called singulators, and the one shown in FIG. 5 and described in more detail in the above-referenced application is generally designated 23.

As a seed opening passes beneath the terminating end wall 21 of the vacuum chamber, the vacuum side of the disc is exposed to the atmosphere so that there is no pressure differential securing seed to its associated seed opening. The seed then releases from the disc and moves, under gravity and centrifugal force, away from its associated seed opening and into a delivery chute, the initial portion of which is seen at 22 in FIGS. 2 and 5, for delivery to a seed furrow formed by the planter. A cover 22A is fixed to the chute (see FIG. 2) to form a closed channel to a seed delivery tube (not shown). As will be apparent to those skilled in the art, the seed meter shown in FIG. 1 is a meter for an individual row unit. A number of such row units are mounted, generally at uniform lateral spacing, along a planter frame, forming a typical row crop planter.

To summarize the operation of the meter shown in FIG. 1, as the seed openings 17, traveling counter-clockwise as seen in FIG. 1, pass beneath the start wall 20 of the vacuum cover 11, the openings are subjected to a partial vacuum or suction. Seeds on the opposite or reservoir side of the disc are thus secured to the openings, at least partially blocking them and held by the differential air pressure across the disc 16. Mechanisms or devices typically are employed to insure that only a single seed occupies the seed opening, such as the singulator shown at 23 in FIG. 5; and the disc continues to rotate until the seed and its associated opening pass beyond the terminating end wall 21 of the vacuum chamber at which time the seed is released, as described above. Thus, in the gap of the vacuum cover 11 between the terminating end wall 21 and the first end wall 20, the differential pressure across the disc is minimal (assuming the pressure in the seed reservoir is properly equalized with atmospheric pressure). It is in this gap, and preferably immediately downstream (e.g. 10°-20° radial) of the terminating end wall 21 of the vacuum chamber that the first ball of a debris clearing device 27 (constructed according to the present invention) is preferably located.

It will be observed that vibrations generated by the debris clearing device 27 on the disc to facilitate release of the seed, are generated at a location immediately downstream of the release point of the seed, and, therefore, are most effective. In the illustrated embodiment, the debris clearing device 27 is mounted on an extension wall 26 of the vacuum cover 11. The wall 26 extends between the start wall 20 and the end wall 21 of the vacuum chamber 13. The bottom of extension wall 26 is spaced axially from the vacuum surface 18 of the rotating seed disc 16, and serves as a support for removably mounting the device 27. As will be described, the clearing device 27 may be mounted or removed manually, without the need for tools by means of an integral clamp.

Turning now to FIGS. 3 and 4, reference numeral 30 generally designates a block or base which may be formed of plastic and therefore molded to the desired or illustrated shape, with suitable cavities for conserving material, while providing the desired strength and durability.

Integrally molded with the block 30 is a clamp, for mounting the clearing device, including a pair of feet 31, 32 which are spaced from a wall 33 of the base 30 to define recesses 35, 36 (FIG. 3) for coupling the clearing device to the outer edge 28 (i.e. closest to the view in FIG. 1) of the extension wall 26 (FIG. 2) of the vacuum cover 11. The wall 33 of device 27 may be segmented (FIG. 3) and faces the center of the seed disc when the debris clearing device 27 is assembled to the vacuum cover, so it may be referred to as an "inner" wall. See, FIG. 2. Spaced centrally or inwardly from the wall 33 is another larger, opposing mounting foot 39 (FIG. 4) formed on an inwardly extending support member 38, located between the feet 31, 32, a foot 39 is formed on the distal end of support member 38. The foot 39 is spaced from the wall 33 to grip the inner edge 29 of the extension wall 26 (FIG. 2) of the vacuum cover 11. Thus, the debris clearing device 27 may be manually assembled to (in a snap fit), or removed from the extension wall 26 of the vacuum cover 11. The distal end of the mounting foot 39 is beveled at 37 (FIG. 3) to permit the device to be manually mounted to the vacuum cover by assembling the feet 31, 32 first, to the outer edge 28 of the extension wall 26; and then rotating the body of the base 30 toward the center of the meter until foot 38 rides over and then snaps into engagement with the opposing inner edge 29 of the extension wall 26, with the spacings 35, 36 and 40 being sized to snuggly engage the associated edges of the extension wall 26, forming a clamp to attach the clearing device 27.

Still referring to FIGS. 3, 4 and 6, and realizing that the debris clearing device 27 is typically used as seen in FIG. 2, at the bottom of the base 30 as shown in FIG. 3, there are formed two openings 43, 44 which are bores for receiving, respectively, coil springs 45, 46. Beneath the coil springs 45, 46 there are located balls 48, 49 which are received in openings 50, 51 of a retainer member 52. The side walls of the openings 50, 51 are cylindrical and of sufficient diameter to permit the balls 48, 49 to reciprocate freely in the openings. The springs 45, 46 bias the balls 48, 49 toward the disc. The edges of the openings 50, 51, however, are reduced as at 53, 54, respectively, for retaining the balls 48, 49 within the retainer member 52. The retainer member 52 is secured to the base 30 by means of a threaded fastener 56 received in an internally threaded bore 58 formed in the base 30 facing the vacuum side of the seed disc 16.

A series of tufts or bristles designated 59 in FIGS. 3 and 4 may be secured into associated openings in the surface 41 of the base 30, downstream (in the direction of disc rotation) of the balls 48, 49.

It will be appreciated that the balls 48, 49 are urged by the springs 45, 46 in an inward axial direction relative to the axis of rotation of the disc 16 (i.e., into the plane of the page of FIG. 1).

In operation, referring to FIG. 1, as the seed openings exit the vacuum chamber by passing beneath the terminating end wall 21, as described above, the seeds are released and the seed openings 17 pass beneath the debris clearing device 27. Initially, the seed openings encounter the first ball 48 which is urged by compression of the coil spring 45 into the seed opening vacated by the released seed. The ball is larger than the seed opening, so only a portion of the ball enters the opening and pushes any debris away from the opening where the debris is free to fall under gravity and disposed of since the removal action takes place in the gap between the start and end walls of the vacuum chamber. At this time the second ball 49 rides on the vacuum surface of disc 16 and enters a detent 19. As the disc rotates, the individual seed opening 17 then passes beneath the second ball 49 which repeats the clearing action of the first ball. It has been found that the use of two balls in succession is effective in clearing debris from the seed openings. The balls may be placed on center with the seed openings (i.e. relative to the distance from the axis of rotation of the disc), however, the circumferential spacing of adjacent seed openings is different from the circumferential spacing of the balls so that only one ball "snaps" into a seed opening at a time. This increases the vibration in the area of seed release to promote the release of seeds. The tufts of brush bristles 59 may be advantageously included, even though not necessarily needed, to clear or brush away any debris that may adhere to the surface of the disc of the seed openings and to assist in removing any remaining debris.

The embodiment illustrated in FIG. 5 is directed to a hill drop planter intended to plant a plurality of seeds in a group, but the invention is useful in other seed meters as well. In this case, the seed openings 17 are arranged in groups of three cells in succession, followed by three detents 19 (FIG. 5). In short, each ball enters three seed openings, and then three detents; and this action continues. The second ball has the same operation, following the first ball because the balls, seed openings and detents, if any, are all centered at the same radius related to the center of the disc and the circumferential spacing (i.e. the angular separation) is uniform for all openings and detents. In this embodiment, the circumferential spacing of cells and detents may be uniform, with the circumferential spacing of the balls is slightly less.

Referring to FIG. 6, the ball 49 has entered a seed opening 49 to clear it, and the ball 48, having passed over three seed openings, has entered a detent 19 to create a vibration in the disc immediately downstream of the point at which a seed is being released (i.e., to the left in FIG. 6). Compare FIG. 5, in which the point of seed release is in the general area designated 60.

Other configurations and combinations of detents and seed openings will depend on the application. And not all applications will require the use of detents, so that they may be eliminated and only seed openings are formed in the disc.

Having thus disclosed in detail an illustrated embodiment of the invention, persons skilled in the art will be able to modify certain aspects of the structure which has been disclosed and to substitute equivalent elements for those described while continuing to practice the principal of the invention; and it is, therefore, intended that all such modifications and substitutions be covered as they are embraced within the spirit and scope of the appended claims.

The invention claimed is:

1. An air seed meter comprising:
 a meter housing;
 a seed disc mounted for rotation within said meter housing and cooperating with said meter housing to define a seed reservoir and a vacuum chamber, said disc having a vacuum side facing the vacuum chamber and including seed openings spaced circumferentially about the disc; and
 a holder fixed to said housing including at least one ball riding on a surface of said disc aligned with said seed openings, said ball located and biased to enter said seed openings seriatim on the vacuum side of said disc as said disc rotates, to clear debris from said seed openings.

2. The seed meter of claim 1 wherein said meter housing includes a seed housing providing a reservoir for seed; and
 a vacuum cover at least partially enclosing said vacuum side of said disc and providing said vacuum chamber inducing a pressure differential across seed openings passing within said vacuum chamber, said vacuum cover including an end wall defining the end of the vacuum chamber.

3. The seed meter of claim 2 wherein said holder includes first and second bore holes radially aligned with seed openings of said disc; a first ball located in the first bore hole and a second ball located in the second bore hole; and first and second springs in said first and second bore holes respectively for biasing said first and second balls respectively into forced contact with the vacuum side of the disc.

4. The seed meter of claim 3 further including at least one detent located adjacent to and downstream of an associated seed opening whereby each of said balls enters a seed hole in sequence to clear debris and then engages a detent to create vibration in the disc adjacent a location at which the seed is released from the disc.

5. The seed meter of claim 3 wherein said vacuum cover includes an extension wall extending between said end wall and a start wall of the vacuum housing, and further comprising:
   a clamp on said holder for attaching to said extension wall downstream of the location at which said seed openings pass beneath said end wall of the vacuum cover.

6. The meter of claim 5 wherein said clamp is manually mountable to and removable from said meter without the need for tools, and may be attached to said meter adjacent a location where said disc exits said meter housing.

7. In an agricultural seed meter having a housing;
   a disc mounted for rotation in the housing and cooperating with the housing to define a seed reservoir and a vacuum chamber having a start wall and an end wall, the disc having a plurality of seed openings extending circumferentially about the disc;
   at least one detent in the vacuum surface of the disc adjacent at least one seed opening;
   a holder fixed to the housing on the vacuum side of said disc and including at least one bore hole extending transverse to the plane of the disc;
   a ball mounted in said bore hole of said holder; and
   a spring in said bore hole for urging said ball in contact with a vacuum side of said disc and in alignment with said seed openings and adjacent said end wall of said vacuum chamber, said ball entering the seed opening and detent seriatim to clear the seed openings of debris, and to facilitate the release of seeds from seed openings adjacent the detent.

8. The meter of claim 7 including a plurality of detents spaced circumferentially about said disc in alignment with said seed holes, wherein said detents and seed openings are located at substantially the same distance from the axis of rotation of the disc.

9. The meter of claim 8 wherein a plurality of seed openings spaced apart at uniform circumferential spacing is adjacent a plurality of detents spaced apart at uniform circumferential spacing.

10. The meter of claim 8 wherein the circumferential spacing of adjacent seed openings is different than the circumferential spacing of adjacent detents.

* * * * *